US011032549B2

United States Patent
Horowitz et al.

(10) Patent No.: US 11,032,549 B2
(45) Date of Patent: Jun. 8, 2021

(54) SPATIAL LAYER RATE ALLOCATION

(71) Applicant: Google LLC, Mountain View, CA (US)

(72) Inventors: Michael Horowitz, Austin, TX (US); Rasmus Brandt, Mountain View, CA (US)

(73) Assignee: Google LLC, Mountain View, CA (US)

( * ) Notice: Subject to any disclaimer, the term of this patent is extended or adjusted under 35 U.S.C. 154(b) by 66 days.

(21) Appl. No.: 16/449,413

(22) Filed: Jun. 23, 2019

(65) Prior Publication Data

US 2020/0036981 A1    Jan. 30, 2020

Related U.S. Application Data

(60) Provisional application No. 62/703,623, filed on Jul. 26, 2018.

(51) Int. Cl.
*H04N 19/147*    (2014.01)
*H04N 19/124*    (2014.01)
(Continued)

(52) U.S. Cl.
CPC ......... *H04N 19/147* (2014.11); *H04N 19/124* (2014.11); *H04N 19/176* (2014.11);
(Continued)

(58) Field of Classification Search
CPC .. H04N 19/147; H04N 19/124; H04N 19/176; H04N 19/18; H04N 19/187;
(Continued)

(56) References Cited

U.S. PATENT DOCUMENTS

| 6,501,797 B1 * | 12/2002 | van der Schaar .... H04N 19/146 375/240.12 |
| 9,591,316 B2 | 3/2017 | Bar Bracha et al. |
| 2015/0195566 A1 | 7/2015 | Hinz et al. |

FOREIGN PATENT DOCUMENTS

WO    2007101791 A1    9/2007

OTHER PUBLICATIONS

Xi Min Zhang, Anthony Vetro, Yun-Qing Shi, and Huifang Sun "Constant-quality constrained-rate allocation for FGS video coded bitstreams", Proc. SPIE 4671, Visual Communications and Image Processing 2002, (Jan. 4, 2002) (Year: 2002).*

(Continued)

*Primary Examiner* — Tat C Chio
(74) *Attorney, Agent, or Firm* — Honigman LLP; Brett A. Krueger

(57) ABSTRACT

A method includes receiving transform coefficients corresponding to a scaled video input signal, the scaled video input signal including a plurality of spatial layers that include a base layer. The method also includes determining a spatial rate factor based on a sample of frames from the scaled video input signal. The spatial rate factor defines a factor for bit rate allocation at each spatial layer of an encoded bit stream formed from the scaled video input signal. The spatial rate factor is represented by a difference between a rate of bits per transform coefficient of the base layer and an average rate of bits per transform coefficient. The method also includes reducing a distortion for the plurality of spatial layers by allocating a bit rate to each spatial layer based on the spatial rate factor and the sample of frames.

20 Claims, 5 Drawing Sheets

(51) Int. Cl.
*H04N 19/176* (2014.01)
*H04N 19/18* (2014.01)
*H04N 19/187* (2014.01)
*H04N 19/60* (2014.01)
*H04N 19/91* (2014.01)

(52) U.S. Cl.
CPC ........... *H04N 19/18* (2014.11); *H04N 19/187* (2014.11); *H04N 19/60* (2014.11); *H04N 19/91* (2014.11)

(58) Field of Classification Search
CPC ...... H04N 19/60; H04N 19/91; H04N 19/136; H04N 19/146; H04N 19/33; H04N 19/126
See application file for complete search history.

(56) References Cited

OTHER PUBLICATIONS

"Rate and distortion modeling of CGS coded scalable video content", Dec. 17, 2010. Authors Hassan Mansour, Panos Nasiopoulos, Vikram Krishnamurthy.

Vivek K Goyal: "Theoretical Foundations of Transform Coding", IEEE Signal Processing Magazine, IEEE Service Center, Piscataway, NJ, US, vol. 18, No. 5, Sep. 1, 2001 (Sep. 1, 2001), pp. 9-21, XP011092356, ISSN: 1053-5888.

Biatek Thibaud et al: "Optimal Bitrate Allocation in the Scalable HEVC Extension for the Deployment of UHD Services", IEEE Transactions on Broadcasting, IEEE Service Center, Piscataway, NJ, US, vol. 62, No. 4, Dec. 1, 2016 (Dec. 1, 2016 ), pp. 826-841, XP011635793, ISSN: 0018-9316, DOI: 10.1109/TBC.2016. 2599266 [retrieved on Dec. 7, 2016].

Michael Horowitz: "Motion Compensated Prediction and the Role of the DCT in Video Coding" ,• Jan. 1, 2008 (Jan. 1, 2008), XP055622431, Retri eved from the Internet:U R L:http <http://users.ece/utexas.edu/bevans/courses/ee38lk/l ectures/12_Video_ Codi ng/Vide oCodi ng.ppt [retri eved on Sep. 16, 2019] * slides 26-35*.

Maria Kozi Ri et al : "Joint quantizer optimization for scalable coding" , 2010 17th IEEE Internati Onal Con Ference on Imag E Processi Ng (ICI P 2010); Sep. 26-29, 2010; Hong Kong, China, IEEE, Piscataway, NJ , USA, Sep. 26, 2010 (Sep. 26, 2010), pp. 1281-1284, XP031814586, ISBN: 978-14244-7992-4 the whol e document.

Chul Lee et al : "Rate-distortion optimized layered coding of high dynamic range videos", Journal of Visual Communication and Image Representation, Academic Press, Inc, US, vol. 23, No. 6, May 30, 2012 May 30, 2012), pp. 908-923, XP028424859, ISSN: 1047-3203, DOI: 10.1016/J.J VCI R.2012.05.009 [retri eved on Jun. 12, 2012] * sections 3.3 and 3.4 *.

International Search Report for the related Application No. PCT/US2019/038626 dated Jun. 23, 2019.

* cited by examiner

SPATIAL LAYER RATE ALLOCATION

CROSS REFERENCE TO RELATED APPLICATIONS

This U.S. patent application claims priority under 35 U.S.C. § 119(e) to U.S. Provisional Application 62/703,623, filed on Jul. 26, 2018. The disclosure of this prior application is considered part of the disclosure of this application and is hereby incorporated by reference in its entirety.

TECHNICAL FIELD

This disclosure relates to spatial layer rate allocation in the context of scalable video coding.

BACKGROUND

As video becomes increasingly more common in a wide range of applications, video streams may need to be encoded and/or decoded several times depending on the application. For example, different applications and/or devices may need to comply with bandwidth or resource constraints. In order to meet these demands requiring several combinations of settings without being prohibitively expensive, high efficiency codecs have been developed that compress video into several resolutions. With codecs such as scalable VP9 and H.264, video bitstreams may contain multiple spatial layers that allow a user to reconstruct the original video at different resolutions (i.e. the resolution of each spatial layer). By having scalable capability, video content may be delivered from device to device with limited further processing.

SUMMARY

One aspect of the disclosure provides a method for allocating bit rate. The method includes receiving, at data processing hardware, transform coefficients corresponding to a scaled video input signal, the scaled video input signal including a plurality of spatial layers, the plurality of spatial layers comprising a base layer. The method also includes determining, by the data processing hardware, a spatial rate factor based on a sample of frames from the scaled video input signal. The spatial rate factor defines a factor for bit rate allocation at each spatial layer of an encoded bit stream formed from the scaled video input signal. The spatial rate factor is represented by a difference between a rate of bits per transform coefficient of the base layer and an average rate of bits per transform coefficient for the plurality of spatial layers. The method also includes reducing a distortion for the plurality of spatial layers of the encoded bit stream by allocating a bit rate to each spatial layer based on the spatial rate factor and the sample of frames.

Implementations of the disclosure may include one or more of the following optional features. In some implementations, the method also includes receiving, at the data processing hardware, a second sample of frames from the scaled video input signal; modifying, by the data processing hardware, the spatial rate factor based on the second sample of frames from the scaled video input signal; and allocating, by the data processing hardware, a modified bit rate to each spatial layer based on the modified spatial rate factor and the second sample of frames. In additional implementations, the method also includes receiving, at the data processing hardware, a second sample of frames from the scaled video input signal; modifying on a frame-by-frame basis, by the data processing hardware, the spatial rate factor based on an exponential moving average, the exponential moving average corresponding to at least the sample of frames and the second sample of frames; and allocating, by the data processing hardware, a modified bit rate to each spatial layer based on the modified spatial rate factor.

In some examples, receiving the scaled video input signal includes receiving a video input signal, scaling the video input signal into the plurality of spatial layers, partitioning each spatial layer into sub-blocks, transforming each sub-block into transform coefficients, and scalar quantizing the transform coefficients corresponding to each sub-block. Determining the spatial rate factor based on the sample of frames from the scaled video input signal may include determining variance estimations of each scalar quantized transform coefficient based on an average across all transform blocks of frames of the video input signal. Here, the transform coefficients of each sub-block may be identically distributed across all sub-blocks.

In some implementations, the method also includes determining, by the data processing hardware, that the spatial rate factor satisfies a spatial rate factor threshold. In these implementations, a value corresponding to the spatial rate factor threshold may satisfy the spatial rate factor threshold when the value is less than about 1.0 and greater than about 0.5. The spatial rate factor may include a single parameter configured to allocate the bit rate to each layer of the encoded bit stream. In some examples, the spatial rate factor includes a weighted sum corresponding to a ratio of a product of variances, wherein the ratio includes a numerator based on estimated variances of scalar quantized transform coefficients from a first spatial layer and a denominator based on estimated variances of scalar quantized transform coefficients from a second spatial layer.

Another aspect of the disclosure provides a system for allocating bit rate. The system includes data processing hardware and memory hardware in communication with the data processing hardware. The memory hardware stores instructions that when executed by the data processing hardware cause the data processing hardware to perform operations. The operations include receiving transform coefficients corresponding to a scaled video input signal, the scaled video input signal including a plurality of spatial layers, the plurality of spatial layers comprising a base layer. The operations also include determining a spatial rate factor based on a sample of frames from the scaled video input signal. The spatial rate factor defines a factor for bit rate allocation at each spatial layer of an encoded bit stream formed from the scaled video input signal. The spatial rate factor is represented by a difference between a rate of bits per transform coefficient of the base layer and an average rate of bits per transform coefficient for the plurality of spatial layers. The operations also include reducing a distortion for the plurality of spatial layers of the encoded bit stream by allocating a bit rate to each spatial layer based on the spatial rate factor and the sample of frames This aspect may include one or more of the following optional features. In some implementations, the operations also include receiving a second sample of frames from the scaled video input signal, modifying the spatial rate factor based on the second sample of frames from the scaled video input signal, and allocating a modified bit rate to each spatial layer based on the modified spatial rate factor and the second sample of frames. In additional implementations, the operations also include receiving a second sample of frames from the scaled video input signal; modifying on a frame-by-frame basis the spatial rate factor based on an exponential moving average, the exponential moving average corresponding to at least the sample of frames and the second sample of frames; and allocating a modified bit rate to each spatial layer based on the modified spatial rate factor.

In some examples, receiving the scaled video input signal includes receiving a video input signal, scaling the video input signal into the plurality of spatial layers, partitioning each spatial layer into sub-blocks, transforming each sub-block into transform coefficients, and scalar quantizing the transform coefficients corresponding to each sub-block. Determining the spatial rate factor based on the sample of frames from the scaled video input signal may include determining variance estimations of each scalar quantized transform coefficient based on an average across all transform blocks of frames of the video input signal. Here, the transform coefficients of each sub-block may be identically distributed across all sub-blocks.

In some implementations, the operations also include determining that the spatial rate factor satisfies a spatial rate factor threshold. In these implementations, a value corresponding to the spatial rate factor threshold may satisfy the spatial rate factor threshold when the value is less than about 1.0 and greater than about 0.5. The spatial rate factor may include a single parameter configured to allocate the bit rate to each layer of the encoded bit stream. In some examples, the spatial rate factor includes a weighted sum corresponding to a ratio of a product of variances, wherein the ratio includes a numerator based on estimated variances of scalar quantized transform coefficients from a first spatial layer and a denominator based on estimated variances of scalar quantized transform coefficients from a second spatial layer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
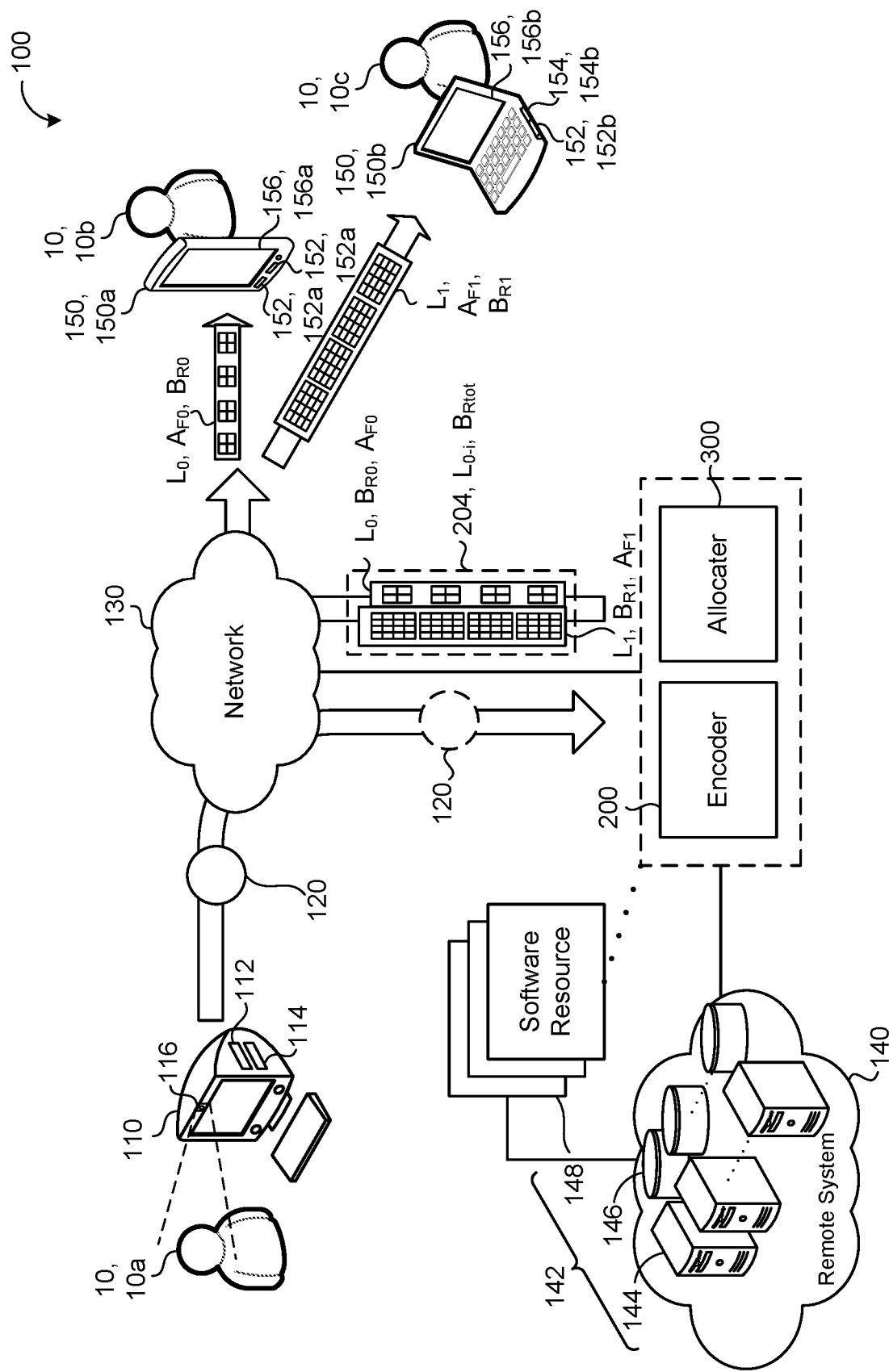
FIG. 1 is a schematic view of an example rate allocation system.

FIG. 1 is an example of a rate allocation system 100. The rate allocation system 100 generally includes a video source device 110 communicating a captured video as a video input signal 120 via a network 130 to a remote system 140. At the remote system 140, an encoder 200 and an allocator 300 convert the video input signal 120 into an encoded bit stream 204. The encoded bit stream 204 includes more than one spatial layer $L_{0-i}$ where i designates the number of spatial layers $L_{0-i}$. Each spatial layer L is a scalable form of the encoded bit stream 204. A scalable video bit stream refers to a video bit stream where parts of the bit stream may be removed in a way that results in a sub-stream (e.g., a spatial layer L) that forms a valid bit stream for some target decoder. More particularly, a sub-stream represents the source content (e.g., captured video) of the original video input signal 120 with a reconstruction quality that is less than the quality of the original captured video. For example, the first spatial layer $L_1$ has a 720p high definition (HD) resolution of 1280×720 while the base layer $L_0$ scales to a resolution of 640×360 as an extended form of video graphics adapter resolution (VGA). In terms of scalability, generally a video may be scalable temporally (e.g., by frame rate), spatially (e.g., by spatial resolution), and/or by quality (e.g., by fidelity often referred to as signal-to-noise-ratio SNR).

The rate allocation system 100 is an example environment where a user 10, 10a captures video at the video source device 110 and communicates the captured video to other users 10, 10b-c. Here, prior to the users 10b, 10c receiving the captured video via video receiving devices 150, 150b-c, the encoder 200 and the allocator 300 convert the captured video into the encoded bit stream 204 at an allocated bit stream rate. Each video receiving device 150 may be configured to receive and/or to process different video resolutions. Here, a spatial layer L with a greater layer number i refers to a layer L with a greater resolution, such that i=0 refers to a base layer $L_0$ with the lowest scalable resolution within the bit stream of more than one spatial layer $L_{0-i}$. Referring to FIG. 1, the encoded video bit stream 204 includes two spatial layers $L_0$, $L_1$. As such, one video receiving device 150 may receive the video content as a lower resolution spatial layer $L_0$ while another video receiving device 150 may receive the video content as a higher resolution spatial layer $L_1$. For example, FIG. 1 depicts a first video receiving device 150a of the user 10b as a cell phone receiving the lower spatial resolution layer $L_0$ while the user 10c with a second receiving device 150b as a laptop receives a higher resolution spatial layer $L_1$.

When different video receiving devices 150a-b receive different spatial layers $L_{0-i}$, the video quality of each spatial layer L may be dependent on a bit rate $B_R$ and/or an allocation factor $A_F$ of the received spatial layer L. Here, the bit rate $B_R$ corresponds to bits per second and the allocation factor $A_F$ corresponds to bits per sample (i.e. transform coefficient). In the case of a scalable bit stream (e.g., the encoded bit stream 204), a total bit rate $B_{Rtot}$ for the scalable bit stream is often constrained such that each spatial layer L of the scalable bit stream suffers similar bit rate constraints. Due to these constraints, the bit rate $B_R$ associated with one spatial layer L may compromise or tradeoff the quality of another spatial layer L. More particularly, if quality is compromised on a spatial layer L received by a user 10 via a video receiving device 150, the quality may generate a negative effect on a user experience. For example, it is becoming more common to transfer video content as a form of communication via real-time communication (RTC) applications. A user 10 of a RTC application may often choose an application for communication based on a subjective quality of the application. Therefore, as an application user, the user 10 generally desires to have a positive communication experience without quality issues that may stem from inadequate bit rate allocation to a spatial layer L that the application user 10 receives. To help ensure a positive user experience, the allocator 300 is configured to adaptively communicate an allocation factor $A_F$ to determine a bit rate $B_R$ for each spatial layer L among multiple spatial layers $L_{0-i}$. By analytically allocating allocation factors $A_F$ among multiple spatial layers $L_{0-i}$, the allocator 300 seeks to achieve the highest video quality over all spatial layers $L_{0-i}$ for a given total bit rate $B_{Rtot}$.

The video source device 110 can be any computing devices or data processing hardware capable of communicating captured video and/or video input signals 120 to a network 130 and/or remote system 140. In some examples, the video source device 110 includes data processing hardware 112, memory hardware 114, and a video capturing device 116. In some implementations, the video capturing device 116 is actually an image capturing device that may communicate a sequence of captured images as video content. For example, some digital cameras and/or webcams are configured to capture images at a particular frequency to form perceived video content. In other examples, the video source device 110 captures video in a continuous analogue format that may subsequently be converted to a digital format. In some configurations, the video source device 110 includes an encoder to initially encode or compress captured data (e.g., analogue or digital) to a format further processed by the encoder 200. In other examples, the video source device 110 is configured to access the encoder 200 at the video source device 110. For example, the encoder 200 is a web application hosted on the remote system 140 yet accessible via a network connection by the video source device 110. In yet other examples, parts or all of the encoder 200 and/or allocator 300 are hosted on the video source device 110. For example, the encoder 200 and the allocator 300 are hosted on the video source device 110, but the remote system 140 functions as a backend system that relays the bit stream including spatial layers $L_{0-i}$ to video receiving device(s) 150 in accordance with decoding capabilities of the video receiving device(s) 150 and a capacity of a connection of the network 130 between the video receiving device(s) 150 and the remote system 140. Additionally or alternatively, the video source device 110 is configured such that the user 10a may engage in communication to another user 10b-c across the network 130 utilizing the video capturing device 116.

The video input signal 120 is a video signal corresponding to captured video content. Here, the video source device 110 captures the video content. For example, FIG. 1 depicts the video source device 110 capturing the video content via a webcam 116. In some examples, the video input signal 120 is an analogue signal that is processed into a digital format by the encoder 200. In other examples, the video input signal 120 has undergone some level of encoding or digital formatting prior to the encoder 200, such that the encoder 200 performs a requantization process.

Much like the video source device 110, the video receiving device 150 can be any computing devices or data processing hardware capable of receiving communicated captured video via a network 130 and/or remote system 140. In some examples, the video source device 110 and the video receiving device 150 are configured with the same functionality such that the video receiving device 150 may become a video source device 110 and the video source device 110 may become a video receiving device 150. In either case, the video receiving device 150 includes at least data processing hardware 152 and memory hardware 154. Additionally, the video receiving device 150 includes a display 156 configured to display the received video content (e.g., at least one layer L of the encoded bit stream 204). As shown in FIG. 1, a user 10b, 10c receives the encoded bit stream 204 at the bit rate $B_R$ as a spatial layer L and decodes and displays the encoded bit stream 204 as a video on the display 156. In some examples, the video receiving device 150 includes a decoder or is configured to access a decoder (e.g., via the network 130) to allow the video receiving device 150 to display content of the encoded bit stream 204.

In some examples, the encoder 200 and/or the allocator 300 is an application hosted by a remote system 140, such as a distributed system of a cloud environment, accessed via the video source device 110 and/or the video receiving device 150. In some implementations, the encoder 200 and/or the allocator 300 is an application downloaded to memory hardware 114, 154 of the video source device 110 and/or the video receiving device 150. Regardless of an access point to the encoder 200 and/or allocator 300, the encoder 200 and/or the allocator 300 may be configured to communicate with the remote system 140 to access resources 142 (e.g., data processing hardware 144, memory hardware 146, or software resources 148). Access to resources 142 of the remote system 140 may allow the encoder 200 and/or the allocator 300 to encode the video input signal 120 into the encoded bit stream 204 and/or allocate a bit rate $B_R$ to each spatial layer L of the more than one spatial layer $L_{0-i}$ of the encoded bit stream 204. Optionally, a real time communication (RTC) application, as a software resource 148 of the remote system 140 used to communicate between users 10, 10a-c, includes the encoder 200 and/or allocator 300 as built-in functionality.

Referring in further detail to FIG. 1, three users 10, 10a-c communicate via a RTC application (e.g., a WebRTC video application hosted by the cloud) hosted by the remote system 140. In this example, the first user 10a is group video chatting with the second user 10b and the third user 10c. As the video capturing device 116 captures video of the first user 10a talking, the captured video via a video input signal 120 is processed by the encoder 200 and the allocator 300 and communicated via network 130. Here, the encoder 200 and the allocator 300 operate in conjunction with the RTC application to generate an encoded bit stream 204 with more than one spatial layer $L_0$, $L_1$ where each spatial layer L has an allocated bit rate $B_{R0}$, $B_{R1}$ determined by allocation factors $A_{F0}$, $A_{F1}$ based on the video input signal 120. Due to the capabilities of each video receiving device 150a, 150b, each user 10b, 10c, receiving the video of the first user 10a chatting, receives a different scaled version of the original video corresponding to the video input signal 120. For example, the second user 10b receives the base spatial layer $L_0$ while the third user 10c receives the first spatial layer $L_1$. Each user 10b, 10c proceeds to display the received video content on a display 156a, 156b communicating with the RTC application. Although, a RTC communication application is shown, the encoder 200 and/or the allocator 300 may be used in other applications involving encoded bit streams 204 with more than one spatial layer $L_{0-i}$.

Figure 2:
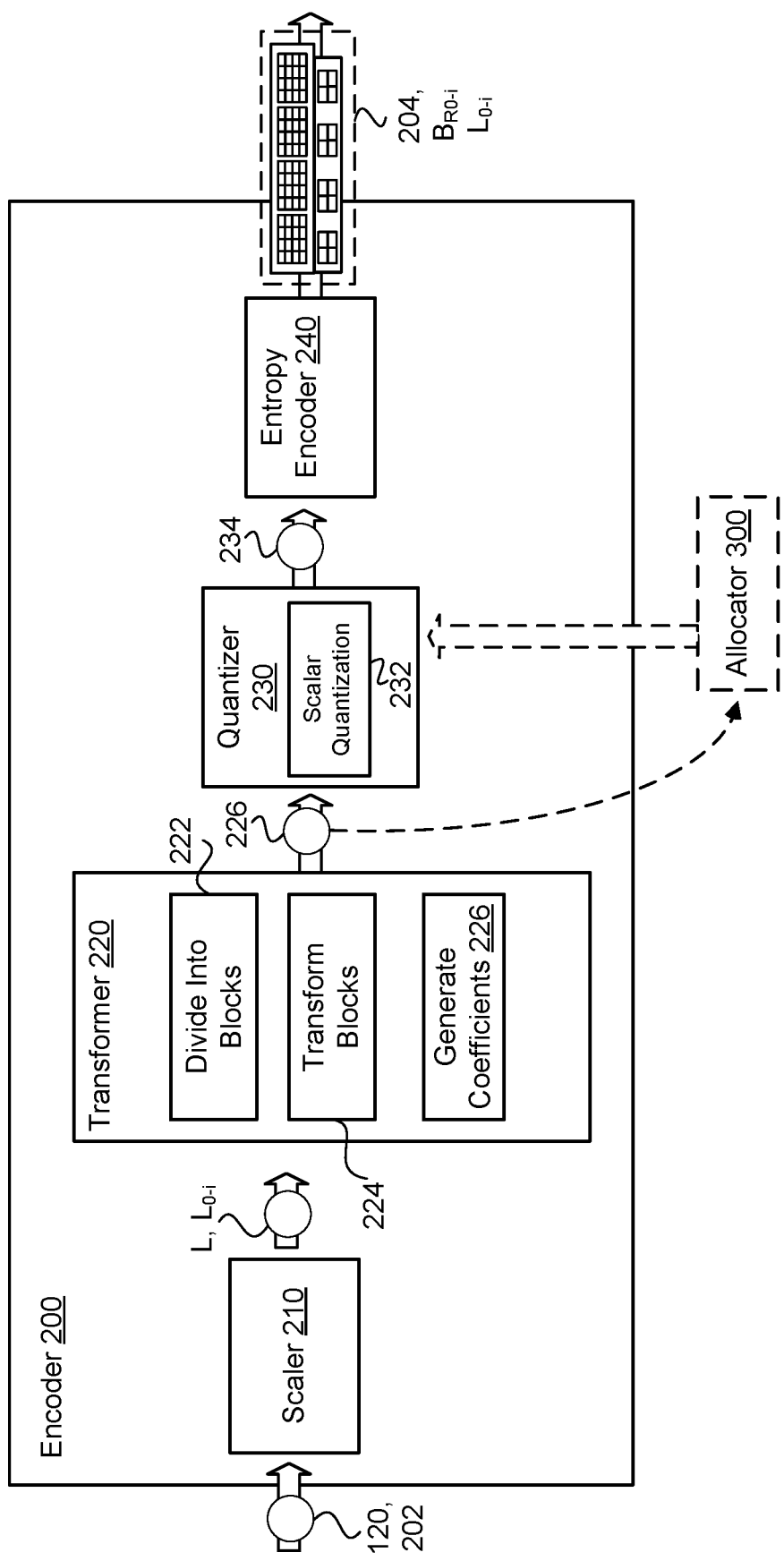
FIG. 2 is a schematic view of an example encoder within the rate allocation system of FIG. 1.

FIG. 2 is an example of an encoder 200. The encoder 200 is configured to convert the video input signal 120 as an input 202 into an encoded bit stream as an output 204. Although depicted individually, the encoder 200 and the allocator 300 may be integrated into a single device (e.g., as shown by the dotted line in FIG. 1) or occur separately across multiple devices (e.g., the video input device 110, the video receiving device 150, or the remote system 140). The encoder 200 generally includes a scaler 210, a transformer 220, a quantizer 230, and an entropy encoder 240. Though not shown, the encoder 200 may include additional components to generate an encoded bit stream 204, such as a prediction component (e.g., a motion estimation and intra prediction) and/or an in-loop filter. The prediction component may generate a residual to be communicated to the transformer 220 for transformation where the residual is based on a difference of an original input frame minus a prediction of a frame (e.g., motion compensated or intra-frame predicted).

The scaler 210 is configured to scale the video input signal 120 into a plurality of spatial layers $L_{0-i}$. In some implementations, the scaler 210 scales the video input signal 120 by determining portions of the video input signal 120 that may be removed to reduce a spatial resolution. By removing a portion or portions, the scalar 210 forms versions of the video input signal 120 to form a plurality of spatial layers (e.g., substreams). The scaler 210 may repeat this process until the scaler 210 forms a base spatial layer $L_0$. In some examples, the scaler 210 scales the video input signal 120 to form a set number of spatial layers $L_{0-i}$. In other examples, the scaler 210 is configured to scale the video input signal 120 until the scaler 210 determines that no decoder exists to decode a substream. When the scaler 210 determines that no decoder exists to decode a substream corresponding to the scaled version of the video input signal 120, the scaler 210 identifies the previous version (e.g., spatial layer L) as the base spatial layer $L_0$. Some examples of scalers 210 include codecs corresponding to a scalable video coding (SVC) extensions, such as an extension of the H.264 video compression standard or an extension of the VP9 coding format.

The transformer 220 is configured to receive each spatial layer L corresponding to the video input signal 120 from the scaler 210. For each spatial layer L, the transformer 220, at operation 222, partitions each spatial layer L into sub-blocks. With each sub-block, at operation 224, the transformer 220 transforms each sub-block to generate transform coefficients 226 (e.g., by discrete cosine transform (DCT)). By generating transform coefficients 226, the transformer 220 may correlate redundant video data and non-redundant video data to aid in the removal of redundant video data by the encoder 200. In some implementations, the transform coefficients also allow the allocator 300 to easily determine a number of coefficients per transform block with non-zero variance in a spatial layer L.

The quantizer 230 is configured to perform a quantization or a re-quantization process 232 (i.e., scalar quantization). A quantization process generally converts input parameters (e.g., from a continuous analogue data set) into a smaller data set of output values. Although a quantization process may convert an analogue signal into a digital signal, here, the quantization process 232 (also sometimes referred to as a requantization process) typically further processes a digital signal. Depending on a form of the video input signal 120, either process may be used interchangeably. By using a quantization or re-quantization process, data may be compressed, but at a cost of some aspect of data loss since the smaller data set is a reduction of a larger or continuous data set. Here, the quantization process 232 converts a digital signal. In some examples, the quantizer 230 contributes to the formation of the encoded bit stream 204 by scalar quantizing the transform coefficients 226 of each sub-block from the transformer 220 into quantization indices 234. Here, scalar quantizing the transform coefficients 226 may allow lossy encoding to scale each transform coefficient 226 in order to contrast redundant video data (e.g., data that may be removed during encoding) to valuable video data (e.g., data that to should not be removed).

The entropy encoder 240 is configured to convert the quantization indices 234 (i.e. quantized transform coefficients) and side information into bits. By this conversion, the entropy encoder 240 forms the encoded bit stream 204. In some implementations, the entropy encoder 240 along with the quantizer 230 enable the encoder 200 to form an encoded bit stream 204 where each layer $L_{0-i}$ has a bit rate $B_{R0-i}$ based on the allocation factor $A_{F0-i}$ determined by the allocator 300.

Figure 3:
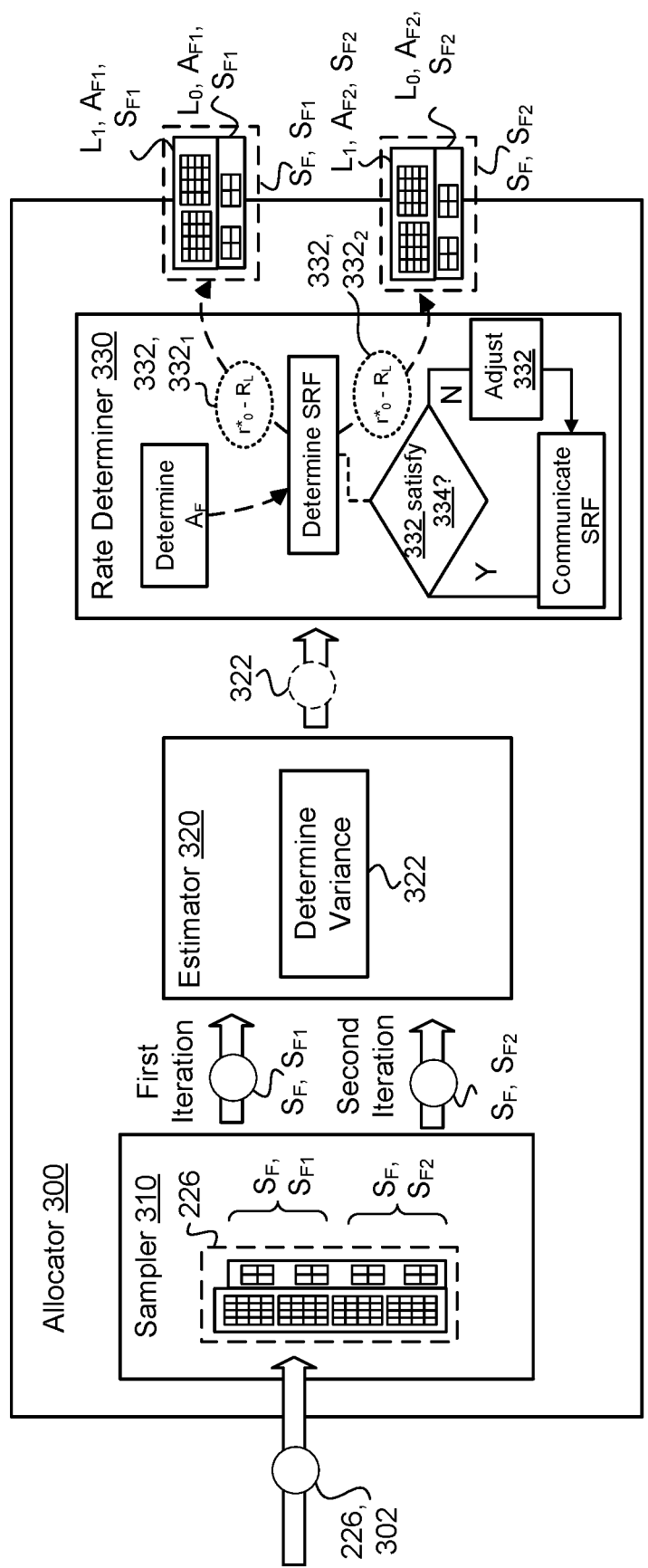
FIG. 3 is a schematic view of an example allocator within the rate allocation system of FIG. 1.

FIG. 3 is an example of the allocator 300. The allocator 300 is configured to receive non-quantized transform coefficients 226 related to more than one spatial layer $L_{0-i}$ and determine an allocation factor $A_F$ for each received spatial layer $L_{0-i}$. In some implementations, the allocator 300 determines each allocation factor $A_F$ based on a square-error based high rate approximation for scalar quantization. Square-error high rate approximation allows a system to determine an optimal (in the context of high-rate approximation) bit rate to allocate for a number N of scalar quantizers. Typically, the optimal bit rate to allocate for N scalar quantizers is determined by rate-distortion optimized quantization. Rate-distortion optimization seeks to improve video quality during video compression by minimizing an amount of distortion (i.e. loss of video quality) subject to a bit rate constraint (e.g., a total bit rate $B_{Rtot}$). Here, the allocator 300 applies the principles that determine the optimal bit rate for N scalar quantizers to determine an optimal allocation factor to allocate a bit rate to each of the more than one spatial layer $L_{0-i}$ of the encoded bit stream 204.

Generally speaking, the square-error high-rate approximation for scalar quantization may be represented by the following equation:

$$d_i = h_i^2 \sigma_i^2 2^{-2r_i} \tag{1}$$

where $h_i^2$ depends on a source distribution of an input signal (e.g., transform coefficients) to an i-th quantizer, $\sigma_i^2$ is a variance of that signal, and $r_i$ is the bit rate for the i-th quantizer in units of bits per input symbol. An expression for optimal rate allocation for two scalar quantizers is derived below using a square-error high-rate approximation.

The average distortion D for a two-quantizer problem, $D_2$ equals $$\frac{d_0 + d_1}{2}.$$

Similarly, the average rate, $R_2$, for a two-quantizer problem equals $$\frac{r_0 + r_1}{2}.$$

Here, $d_i$ is a square-error distortion due to an i-th quantizer and $r_i$ is a bit rate allocated to the i-th quantizer in units of bits per sample. Although, the parameter $d_i$ is a function of rate, $r_i$, such that an equation like $d_i(r_i)$, would be appropriate; for convenience $d_i$ is simply represented as $d_i$ instead. Substituting the high-rate approximation for $d_0$ and $d_1$ into the equation for $D_2$ yields:

$$D_2 = \frac{1}{2} h_0^2 \sigma_0^2 2^{-2r_0} + \frac{1}{2} h_1^2 \sigma_1^2 2^{-2r_1} \tag{2}$$

With equation (2), $2R_2 - r_0$ may be substituted for $r_1$ to yield:

$$D_2 = \frac{1}{2} h_0^2 \sigma_0^2 2^{-2r_0} + \frac{1}{2} h_1^2 \sigma_1^2 2^{-2(2R_2 - r_0)} \tag{3}$$

By further taking a derivative of $D_2$ with respect to $r_0$ equation (3) yields the following expression:

$$\frac{dD_2}{dr_0} = -2\ln(2)\frac{1}{2}h_0^2\sigma_0^2 2^{-2r_0} + 2\ln(2)\frac{1}{2}h_1^2\sigma_1^2 2^{-4R}2^{2r_0} \quad (4)$$

Setting the above expression, equation (4), equal to zero and solving for $r_0$ results in an expression for the optimal rate $r^*$ for a zero quantizer represented as follows:

$$r_0^* = R + \frac{1}{2}\log_2\left(\frac{h_0^2\sigma_0^2}{(h_0^2\sigma_0^2 h_1^2\sigma_1^2)^{\frac{1}{2}}}\right) \quad (5)$$

Because the expression for high-rate distortion is convex, the minimum found by setting the derivative to zero is global. Similarly, an optimal rate $r^*$ for the first quantizer can be expressed as follows:

$$r_1^* = R + \frac{1}{2}\log_2\left(\frac{h_1^2\sigma_1^2}{(h_0^2\sigma_0^2 h_1^2\sigma_1^2)^{\frac{1}{2}}}\right) \quad (6)$$

To find an optimal quantizer distortion, $d_0^*$ and $d_1^*$, equations (5) and (6) are substituted for the optimal rate into the respective high-rate expressions for a scalar quantizer distortion as follows:

$$d_i^* = h_i^2\sigma_i^2 2^{-2r_i^*} = h_i^2\sigma_i^2 2^{-2\left(R+\frac{1}{2}\log_2\left(\frac{h_i^2\sigma_i^2}{(h_0^2\sigma_0^2 h_1^2\sigma_1^2)^{\frac{1}{2}}}\right)\right)} \quad (7)$$

A simplified form of equation (7) yields the following equation:

$$d_i^* = h_0\sigma_0 h_1\sigma_1 2^{-2R} \text{ for all } i \quad (8)$$

This same two-quantizer analysis may be extended to three quantizers by combining the zero quantizer and the first quantizer into a single quantization system (i.e. a nested system) where the combined quantizer is already solved according to equations (1)-(8). Using a similar methodology to the two-quantizer rate allocation, a three-quantizer system is derived as follows.

Since the average per-quantizer distortion for a two-quantizer system is represented as $$d_{avg} = \frac{d_0 + d_1}{2},$$

by substituting $d_{avg}$ into the expression for an average three-quantizer distortion, $$D_3 = \frac{d_0 + d_1 + d_2}{3}$$

yields the following equation:

$$D_3 = \frac{2d_{avg}}{3} + \frac{d_2}{3} \quad (9)$$

Similarly, an average rate for a three-quantizer system is represented as follows:

$$R_3 = \frac{2r_{avg}}{3} + \frac{r_2}{3}, \text{ where } r_{avg} = \frac{r_0 + r_1}{2} \quad (10)$$

Utilizing the result for optimal distortion from the two-quantizer analysis as shown in equation (8), it follows that the three-quantizer distortion may be represented by the following equation:

$$D_3 = \frac{2}{3}h_0\sigma_0 h_1\sigma_1 2^{-2r_{avg}} + \frac{1}{3}h_2^2\sigma_2^2 2^{-2r_2} \quad (11)$$

Accordingly, when equation (11) is simplified and $r_{avg}=3/2R_3-\frac{1}{2}r_2$ is substituted into equation (11), equation (11) transforms into the following expression:

$$D_3 = \frac{2}{3}h_0\sigma_0 h_1\sigma_1 2^{-3R_3}2^{r_2} + \frac{1}{3}h_2^2\sigma_2^2 2^{-2r_2} \quad (12)$$

With equation (12), the derivative with respect to $r_2$ may be set to zero and solved for $r_2$ to yield the following equation:

$$r_2^* = R_3 + \frac{1}{2}\log_2\left(\frac{h_2^2\sigma_2^2}{(h_0^2\sigma_0^2 h_1^2\sigma_1^2 h_2^2\sigma_2^2)^{\frac{1}{3}}}\right) \quad (13)$$

For three quantizers, a more general representation of equation (13) may be expressed as follows:

$$r_i^* = R_3 + \frac{1}{2}\log_2\left(\frac{h_i^2\sigma_i^2}{(h_0^2\sigma_0^2 h_1^2\sigma_1^2 h_2^2\sigma_2^2)^{\frac{1}{3}}}\right) \quad (14)$$

Based on the first and the second quantizers, an expression for an optimal rate allocation $r^*$ for N quantizers may be derived. An expression for an optimal rate for the i-th quantizer is as follows:

$$r_i^* = R_N + \frac{1}{2}\log_2\frac{h_i^2\sigma_i^2}{\left(\prod_{j=0}^{N-1} h_j^2\sigma_j^2\right)^{\frac{1}{N}}} \quad (15)$$

By substituting the expression for the optimal rate into the high-rate expression for distortion and simplifying similarly to the two-quantizer expressions, the resulting expression for optimal distortion in terms of N quantizers is shown below.

$$D^* = \Pi_{j=0}^{N-1} h_j\sigma_j 2^{-2R_N} \text{ for all } i \quad (16)$$

Based on the derived expressions from equations (1)-(16), the allocator 300 may apply these expressions for the optimal distortion to determine an optimal allocation factor $A_F$ (i.e. contribute to an optimal bit rate $B_R$) for each layer L of the plurality of spatial layers $L_{O-i}$. Similar to the derived N quantizer expressions, multiple spatial layer bit rates may be deduced from expressions associated with a two and a three layer rate allocation system. In some examples, it is assumed that although spatial layers $L_{O-i}$ typically have different spatial dimensions, the spatial layers $L_{O-i}$ originate from the same video source (e.g., the video source device 110). In some implementations, the scalar quantizers that encode a first spatial layer $L_0$ and a second spatial layer $L_1$ are assumed to be identical in structure even though values of these scalar quantizers may differ. Moreover, for each spatial layer L, a number of samples S generally equates to a number of transform coefficients 226 (i.e. also equates to a number of quantizers).

In the case of a two-spatial layer rate allocation system, an average distortion for two-spatial layers, $D_2$, may be represented as a weighted sum of average distortions, $d_0$ and $d_1$, corresponding to the first and the second spatial layer $L_0$, $L_1$ (i.e. spatial layers 0 and 1) as follows:

$$D_2 = \frac{s_0 d_0 + s_1 d_1}{S} \tag{17}$$

where $s_i$ equals the number of samples in the i-th spatial layer $L_i$ and $S=s_0+s_1$. Similarly, an average bit rate for two-spatial layers may be expressed as follows $$R_2 = \frac{s_0 r_0 + s_1 r_1}{S} \tag{18}$$

where $r_0$ and $r_1$ are average bit rates of the first and the second spatial layer $L_0$, $L_1$, respectively. By substituting the expression for N-quantizer optimal distortion (i.e. equation (16)), into equation (17) for $D_2$, above, $D_2$ may be expressed as follows:

$$D_2 = \frac{s_0}{S} \prod_{j=0}^{s_0-1} h_{j,0} \sigma_{j,0} 2^{-2r_0} + \frac{s_1}{S} \prod_{j=0}^{s_1-1} h_{j,1} \sigma_{j,1} 2^{-2r_1} \tag{19}$$

where $\sigma_{j,i}^2$ is a variance of an input signal to the j-th scalar quantizer in the i-th spatial layer $L_i$. Solving for $r_1$ in equation (18) and substituting the result into equation (19) yields:

$$D_2 = \frac{s_0}{S} \prod_{j=0}^{s_0-1} h_{j,0} \sigma_{j,0} 2^{-2r_0} + \frac{s_1}{S} \prod_{j=0}^{s_1-1} h_{j,1} \sigma_{j,1} 2^{-\frac{2SR_2}{s_1}} 2^{-\frac{2s_0 r_0}{s_1}} \tag{20}$$

Furthermore, by setting the derivative of $D_2$ with respect to $r_0$ to zero and solving for $r_0$, $r_0$ may be represented by the following equation:

$$r_0^* = R_2 + \frac{s_1}{2S} \log_2 \frac{\prod_{j=0}^{s_0-1} h_{j,0} \sigma_{j,0}}{\prod_{j=0}^{s_1-1} h_{j,1} \sigma_{j,1}} \tag{21}$$

To simplify equation (21) for notational convenience, $P_i = \prod_{j=0}^{s_i-1} h_{j,i} \sigma_{j,i}$. Substituting this expression for $P_i$ into equation (21) for $r_0^*$ and rearranging the resulting terms forms the following expression that appears similar to the N-quantizer allocation expression:

$$r_0^* = R_2 + \frac{1}{2} \log_2 \left( \frac{P_0}{(P_0^{s_0} P_1^{s_1})^{\frac{1}{S}}} \right). \tag{22}$$

Alternatively, equation (22) may be expressed in terms of $r_1^*$ to achieve the following equation:

$$r_1^* = R_2 + \frac{1}{2} \log_2 \left( \frac{P_1}{(P_0^{s_0} P_1^{s_1})^{\frac{1}{S}}} \right) \tag{23}$$

Based on equations (17)-(23), an optimal two-spatial-layer distortion may be expressed as follows:

$$D_2^* = (P_0^{s_0} P_1^{s_1})^{\frac{1}{S}} 2^{-2R_2} \tag{24}$$

A similar approach may develop an optimal allocation factor that applies to three spatial layers $L_{0\text{-}2}$. Much like the two spatial layers $L_0$, $L_1$, $s_i$ equals the number of samples in the i-th spatial layer $L_i$ such that $S=s_0+s_1+s_2$. An average rate and a distortion for the three-spatial layers $L_{0\text{-}2}$, $R_3$ and $D_3$, respectively, may be represented as the weighted sum of average rates and distortions, $r_0$, $r_1$, and $r_2$ and $d_0$, $d_1$, and $d_2$ of spatial layers 0, 1, and 2 (e.g., three spatial layers $L_{0\text{-}2}$) as follows:

$$R_3 = \frac{s_0 r_0 + s_1 r_1 + s_2 r_2}{S} \text{ and} \tag{25}$$

$$D_3 = \frac{s_0 d_0 + s_1 d_1 + s_2 d_2}{S} \tag{26}$$

When similar techniques are applied from the two-quantizer results to three quantizers, $R_3$ may be expressed as a combination of an average two-layer rate, $R_2$, using the following equation:

$$R_3 = \frac{(s_0 + s_1) R_2 + s_2 r_2}{S} \tag{27}$$

$$\text{where } R_2 = \frac{s_o r_o + s_1 r_1}{s_o + s_1}. \tag{28}$$

Similarly, for three quantizers, the distortion may be represented as follows:

$$D_3 = \frac{(s_0 + s_1) D_2 + s_2 d_2}{S} \tag{29}$$

$$\text{where } D_2 = \frac{s_o d_o + s_1 d_1}{s_o + s_1} \tag{30}$$

With equation (24) for two-layer optimal distortion $D_2^*$, and equation (8) for optimal N-quantizer distortion, $d_i^*$, equation (29) may be solved for $D_3$ to yield the following expression:

$$D_3 = \frac{(s_0+s_1)(P_0^{s_0}P_1^{s_1})^{\frac{1}{(s_0+s_1)}}2^{-2R_2}+s_2P_2 2^{-2r_2}}{S} \quad (31)$$

where $P_i=\Pi_{j=0}^{s_{i-1}}h_{j,i}\sigma_{j,i}$. Equation (27) may be solved for $R_2$ to yield the following expression:

$$R_2 = \frac{SR_3-s_2 r_2}{(s_o+s_1)} \quad (32)$$

Furthermore, combining equations (31) and (32) by substituting equation (32) into equation (31) for $D_3$ forms the following equation:

$$D_3 = \frac{(s_0+s_1)}{S}(P_0^{s_0}P_1^{s_1})^{\frac{1}{(s_0+s_1)}}2^{-2\left(\frac{SR_3-s_2 r_2}{(s_0+s_1)}\right)}+\frac{s_2}{S}P_2 2^{-2r_2} \quad (33)$$

An expression for $r_2$ may be formed by taking the derivative of $D_3$ with respect to $r_2$ and setting the result equal to zero. This expression may be expressed by the following equation:

$$r_2^* = R_3 + \quad (34)$$

$$\frac{(s_0+s_1)}{2S}\log_2\left(\frac{P_2}{\frac{s_0}{(s_0+s_1)}P_0\left(\frac{P_1}{P_0}\right)^{\frac{s_1}{(s_0+s_1)}}+\frac{s_1}{(s_0+s_1)}P_1\left(\frac{P_0}{P_1}\right)^{\frac{s_0}{(s_0+s_1)}}}\right)$$

When terms are rearranged, equation (34) may look similar to the N-quantizer allocation expression as follows:

$$r_2^* = R_3 + \frac{1}{2}\log_2\left(\frac{P_2}{(P_0^{s_0}P_1^{s_1}P_2^{s_2})^{\frac{1}{S}}}\right) \quad (36)$$

Applying this equation (36) to the first layer $L_0$ and the second layer $L_1$, the allocation factor for each layer may be expressed as follows:

$$r_0^* = R_3 + \frac{1}{2}\log_2\left(\frac{P_0}{(P_0^{s_0}P_1^{s_1}P_2^{s_2})^{\frac{1}{S}}}\right) \quad (37)$$

$$\text{and } r_1^* = R_3 + \frac{1}{2}\log_2\left(\frac{P_1}{(P_0^{s_0}P_1^{s_1}P_2^{s_2})^{\frac{1}{S}}}\right) \quad (38)$$

Both derivations of the two-spatial layer $L_{0-1}$ and the three spatial layer $L_{0-2}$ illustrate a pattern that may be extended to multiple spatial layers to optimize rate allocation (e.g., allocation factor $A_F$ for determining a bit rate $B_R$ allocated to each spatial layer $L$) at the allocator 300. Here, extending the above results to $L$ spatial layers $L_{1-L}$ yields a universal expression represented by the following equation:

$$r_i^* = R_L + \frac{1}{2}\log_2\left(\frac{P_i}{\left(\prod_{j=0}^{L-1}P_j^{s_j}\right)^{\frac{1}{S}}}\right) \quad (39)$$

where $R_L$ is the average rate corresponding to bits per sample over $L$ spatial layers $L_{0-i}$; the total number of samples $S$ over $L$ spatial layers where $S=\Sigma_{i=0}^{L-1}s_i$; $s_i$ is the number of samples in the i-th spatial layer; $P_i=\Pi_{j=0}^{s_{i-1}}h_{j,i}\sigma_{j,i}$, where $h_{j,i}$ depends on a source distribution of the signal being quantized by the j-th quantizer in the i-th spatial layer; and $\sigma_{i,j}^2$ corresponds to a variance of the j-th transform coefficient in the i-th spatial layer.

In some implementations, equation (39) has different forms due to various assumptions. Two different forms of equation (39) are represented below.

$$r_i^* = R_L + \frac{1}{2}\sum_{j=0}^{L-1}\frac{s_j'}{S'}\log_2\left(\frac{P_i}{P_j}\right) \quad (39a)$$

$$R_i^* = R_L + \frac{1}{2}\sum_{j=0}^{L-1}\frac{s_j}{S}\log_2\left(\frac{P_i}{P_j}\right) \quad (39b)$$

For instance, a value for $h_{j,i}$ depends on a source distribution of the video input signal 120 being quantized by the j-th quantizer in the i-th spatial layer $L_i$. In examples with similar source distributions, a value for $h_{j,i}$ does not change from quantizer to quantizer and thus cancels due to the ratio of product terms within equation (39). In other words, $h_{j,0}=h_{j,1}=h_{j,2}=h$. Consequently, when this cancelation occurs, the term $P_i=\Pi_{j=0}^{s_{i-1}}h_{j,i}\sigma_{j,i}=h\Pi_{j=0}^{s_{i-1}}\sigma_{j,i}$, which effectively eliminates this parameter from consideration since $P_i$ always appears as a ratio where $h$ is in the numerator to cancel like terms in the denominator. In practice, $h_{j,0}$ may differ from $h_{j,1}$ and $h_{j,2}$ because the base spatial layer $L_0$ uses only temporal prediction whereas other spatial layers may use both temporal and spatial prediction. In some configurations, this difference does not significantly affect the allocation factor $A_F$ determined by the allocator 300.

In other implementations, the encoder 200 introduces transform blocks that result in transform coefficients 226. When this occurs, a change may occur to the grouping of transform coefficients 226 that introduces a variable $s_i'$. The variable $s_i'$ corresponds to an average number of transform coefficients 226 per transform block with non-zero variance in the i-th spatial layer $L$ as shown in equation (39a). Contrast, this variable $s_i'$ to $s_i$ of equation (39b) that corresponds to the number of samples $S$ in the i-th spatial layer $L_i$. Additionally, in equation (39a), the term $P_i=\Pi_{k=0}^{s'_{i-1}}\sigma_{k,i}$ where $\sigma^2_{k,i}$ is the variance of the k-th coefficient in a transform block in the i-th spatial layer $L_i$. Practically speaking, equation (39a) represents the optimal bit rate allocation for the i-th spatial layer $L$ as an expression of a weighted sum of the ratios of the products of variances $$\left(\text{e.g., }\frac{1}{2}\sum_{j=0}^{L-1}\frac{s_j'}{S'}\log_2\left(\frac{P_i}{P_j}\right)\right).$$

Referring to FIG. 3, in some implementations, the allocator 300 includes a sampler 310, an estimator 320, and a rate determiner 330. The sampler 310 receives, as an input 302 of the allocator 300, non-quantized transform coefficients 226 with a plurality of spatial layers $L_{0-i}$. For example, FIG. 2 illustrates the transform coefficients 226 generated by the transformer 220 communicated to the allocator 300 by a dotted line. With the received non-quantized transform coefficients 226, the sampler 310 identifies frames of the video input signal 120 as a sample $S_F$. Based on the sample $S_F$ identified by the sampler 310, the allocator 300 determines an allocation factor $A_F$ for each spatial layer L. In some implementations, the allocator 300 is configured to dynamically determine the allocation factor $A_F$ of each spatial layer L. In these implementations, the sampler 310 may be configured to iteratively identify sets of frame samples $S_F$ such that the allocator 300 may adapt the allocation factor $A_F$ to each set of samples $S_F$ identified by the sampler 310. For instance, the allocator 310 determines an allocation factor $A_F$ to each spatial layer L based on a first sample $S_{F1}$ of frames of the video input signal 120 and then proceeds to adjust or to modify the allocation factor $A_F$ (e.g., shown in FIG. 3 as changing from a first allocation factor $A_{F1}$ for the first sample $S_{F1}$ to a second allocation factor $A_{F2}$ for the second sample $S_{F2}$) applied to each spatial layer L (e.g., if necessary) based on a second sample $S_{F2}$ of frames of the video input signal 120 identified by the sampler 310. This process may iteratively continue for the duration that the allocator 300 receives the video input signal 120. In these examples, the allocator 300 modifies the allocation factor $A_F$, which in turn, changes a spatial rate factor 332 (e.g., from a first spatial rate factor $332_1$ to a second spatial rate factor $332_2$) based on changes between the first sample $S_{F1}$ and the second sample $S_{F2}$. Additionally or alternatively, the allocator 300 may modify the allocation factor $A_F$ on a frame-by-frame basis using an exponential moving average. An exponential moving average is generally a weighted moving average that weighs the allocation factor $A_F$ determined for the current frame with the weighted average of allocation factors $A_F$ from previous frames. In other words, here, each modification to the allocation factor $A_F$ is a weighted average with a current and previous allocation factor(s) $A_F$.

The estimator 320 is configured to determine variance estimations 322 of each transform coefficient from the encoder 200. In some configurations, the estimator 320 assumes that the transform coefficients 226 in each block from the transformer 220 are similarly distributed. Based on this assumption, variances of the transform coefficients 226 may be estimated by averaging across all transform blocks in sample frames $S_F$ of the video input signal 120. For example, the expression below models the k-th transform coefficient 226 in the i-th spatial layer $L_i$ as a random variable $E_{k,i}$.

$$\sigma_{k,i}^2 = \frac{1}{S_F B_i} \sum_{b=0}^{B_i-1} \sum_{t=0}^{S_F-1} \varepsilon_{b,k,i,t}^2 - \left( \frac{1}{S_F B_i} \sum_{b=0}^{B_i-1} \sum_{t=0}^{S_F-1} \varepsilon_{b,k,i,t} \right)^2 \quad (40)$$

where $\varepsilon_{b,k,i,t}$ is the k-th transform coefficient 226 in the b-th transform block in the i-th spatial layer $L_i$ in the t-th frame and $B_i$ represents the number of blocks in the i-th spatial layer $L_i$, and $S_F$ represents the number of sample frames used to estimate the variance. In some examples, the value of $\sigma_{k,i}^2$ is an estimate of the variance of the k-th transform coefficient 226 in the i-th spatial layer $L_i$, independent of the transform block when all such blocks are assumed to have identical statistics. In practice, however, the statistics of transform blocks may vary across the frame. This may be especially true for video conferencing content where blocks at the edge of the frame may have less activity than at the center. Accordingly, if these non-identical statistics negatively affect an accuracy of the rate allocation result, estimating variance based on blocks centrally located in the frame may mitigate the negative affect. In some configurations, the sub-blocks for which the variances of the transform coefficients are estimated represent a subset of all sub-block in the video picture (e.g., the sub-blocks located in the center-most portion of the video picture or the sub-blocks in locations in which the video picture has changed relative to previous pictures).

The rate determiner 330 is configured to determine a spatial rate factor 332 based on the sample $S_F$ of frames from the video input signal 120 identified by the sampler 310. In some examples, the spatial rate factor 332 defines a factor for determining a bit rate $B_R$ at each spatial later $L_{0-i}$ of the encoded bit stream 204. A spatial rate factor 332 is a ratio between a bit rate allocated to spatial layer $L_{i-1}$ and a bit rate allocated to spatial layer $L_i$. In a two-spatial example with spatial layers $L_0$ and $L_1$, a spatial rate factor equal to 0.5, and the bit rate allocated to spatial layer $L_1$ equal to 500 kbps, the bit rate allocated for spatial layer $L_0$ equals 250 kbps (i.e. 0.5 times 500 kbps). In these implementations, the value of the spatial rate factor 332 is set equal to a difference between an allocation factor $A_F$ of a base layer $L_0$ and an average rate $R_L$ (e.g., the expression $r^*_0 - R_L$ of equation (39)). Here, the allocation factor $A_F$ corresponds to bits per transform coefficient for the base layer $L_0$ (also referred to as $r^*_0$) while the average rate $R_L$ corresponds to bits per transform coefficient for the more than one spatial layer $L_{0-i}$. In some configurations, experimental results for two spatial layers have indicated that the spatial rate factor 332 corresponds to the expression $$srf = 0.65 + \frac{r_0^* - R_L}{20}.$$

The spatial rate factor 332, as a single parameter, may allow the allocator 300 to easily tune or modify the bit rates $B_R$ for each layer L of the encoded bit stream 204.

Although explained with respect to two spatial layers, the allocator 300 may apply the spatial rate factor 332 and/or the allocation factor $A_F$ to any number of spatial layers $L_{0-i}$. For instance, the allocator 300 determines the allocation factor $A_F$ and/or the spatial rate factor 332 with respect to each set of two spatial layers. To illustrate with three layers $L_{0-2}$, the allocator 300 determines the allocation factor $A_F$ for the base layer $L_0$ and the first layer $L_1$ and then determines the allocation factor $A_F$ for the first layer $L_1$ and the second layer $L_2$. Each allocation factor $A_F$ may be used to determine a spatial rate factor 332, one spatial rate factor 332 for the base layer $L_0$ and the first layer $L_1$ and a second spatial rate factor 332 for the first layer $L_1$ and the second layer $L_2$ With the spatial rate factor 332 for each set of two spatial layers, the allocator 300 may average (e.g., a weighted average, an arithmetic average, a geometric average, etc.) the spatial rate factors 332 and/or the allocation factors $A_F$ to generate an average spatial rate factor and/or average allocation factor for any number of spatial layers $L_{0-i}$.

In some examples, the spatial rate factor 332 must satisfy a spatial rate factor threshold 334 (e.g., be within a range of values) in order for the allocator 300 to help determine a bit rate $B_R$ based on the spatial rate factor 332. In some implementations, a value satisfies the spatial rate factor threshold 334 when the value is within a range less than about 1.0 and greater than about 0.5. In other implementations, the spatial rate factor threshold 334 corresponds to a narrower range of values (e.g., 0.55-0.95, 0.65-0.85, 0.51-0.99, 0.65-1.0, 0.75-1.0, etc.) or a broader range of values (e.g., 0.40-1.20, 0.35-0.95, 0.49-1.05, 0.42-1.17, 0.75-1.38, etc.). In some configurations, when the spatial rate factor 332 is out of the range of values corresponding to the spatial rate factor threshold 334, the allocator 300 adjusts the spatial rate factor 332 to satisfy the spatial rate factor threshold 334. For instance, when the spatial rate factor threshold 334 ranges from 0.45-0.95, a spatial rate factor 332 outside this range is adjusted to a nearest maximum of the range (e.g., a spatial rate factor 332 of 0.3 is adjusted to a spatial rate factor 332 of 0.45 while a spatial rate factor 332 of 1.82 is adjusted to a spatial rate factor 332 of 0.95).

Based on the determined spatial rate factor 332, the allocator 300 is configured to optimize the video quality by reducing a distortion for the more than one spatial layer $L_{0\text{-}i}$ subject to a constraint on the total bit rate $B_{Rtot}$. To reduce the distortion, the allocator 300 influences (e.g., aids the encoder 200 to determine) a bit rate $B_R$ to each spatial layer L based on the spatial rate factor 332 computed for the sample $S_F$ of frames. For example, when the encoded bit stream 204 includes two spatial layers $L_0$, $L_1$, the allocator 300 determines an allocation factor $A_F$, which in turn is used to determine a spatial rate factor 332 to generate a first bit rate $B_{R1}$ corresponding to an equation $$B_{R1} = \frac{B_{Rtot}}{(1+srf)}$$

and a second bit rate $B_{R0}$ corresponding to an equation $$B_{R0} = \frac{(B_{Rtot} * srf)}{(1+srf)}$$

where $B_{Rtot}$ corresponds to the total bit rate available to encode the overall bitstream (i.e., all spatial layers $L_0$, $L_1$).

Figure 4:
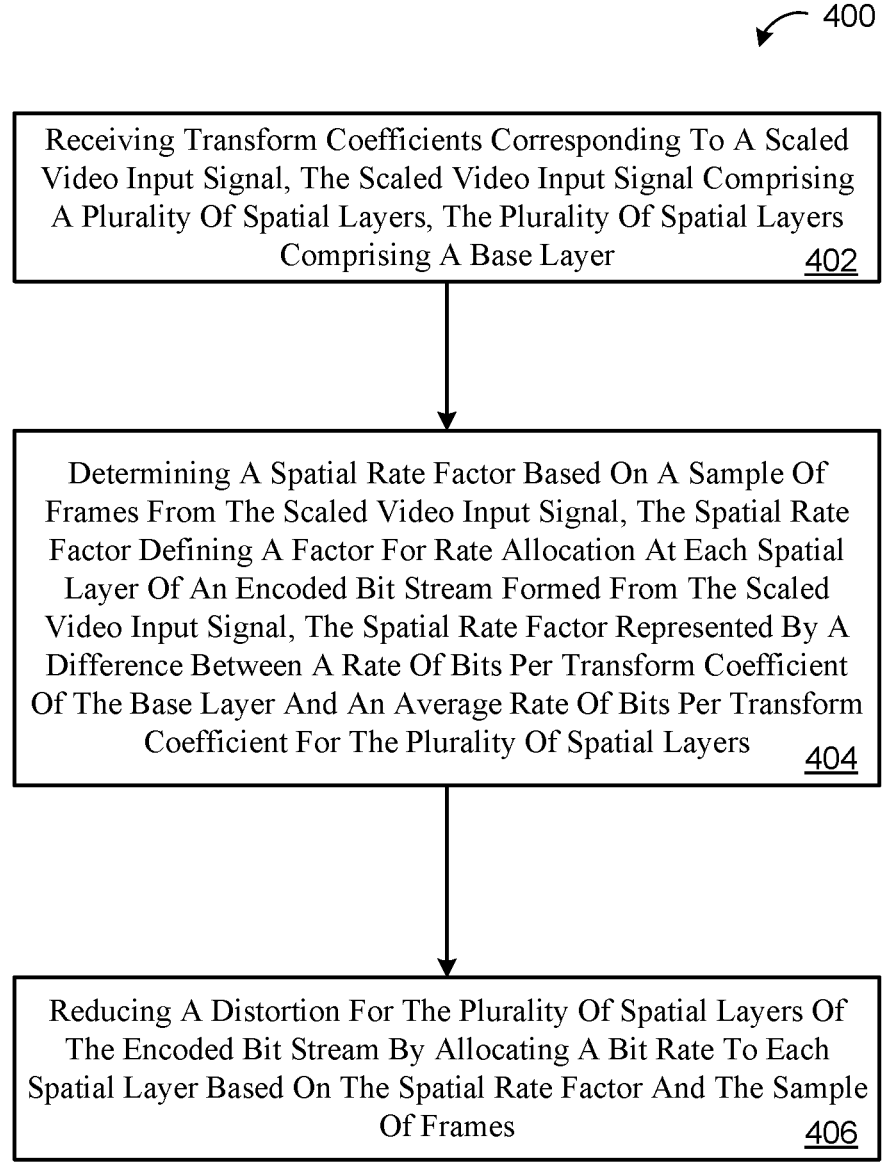
FIG. 4 is a flow diagram of an example method for implementing a rate allocation system.

FIG. 4 is an example of a method 400 for implementing the rate allocation system 100. At operation 402, the method 400 receives, at data processing hardware 510, transform coefficients 226 (e.g., non-quantized transform coefficients) corresponding to a video input signal 120. The video input signal 120 includes a plurality of spatial layers $L_{0\text{-}i}$ where the plurality of spatial layers $L_{0\text{-}i}$ includes a base layer $L_0$. At operation 404, the method 400 determines, by the data processing hardware 510, a spatial rate factor 332 based on a sample $S_F$ of frames from the video input signal 120. The spatial rate factor 332 defines a factor for rate allocation at each spatial layer L of the encoded bit stream 204 and is represented by a difference between a rate of bits per transform coefficient for the base layer $L_0$ and an average rate $R_L$, of bits per transform coefficient of the plurality of spatial layers $L_{0\text{-}i}$. At operations 406, the method 400 reduces, by the data processing hardware 510, a distortion d for the plurality of spatial layers $L_{0\text{-}i}$ of the encoded bit stream 204 by allocating a bit rate $B_R$ to each spatial layer L based on the spatial rate factor 332 and the sample $S_F$ of frames.

Figure 5:
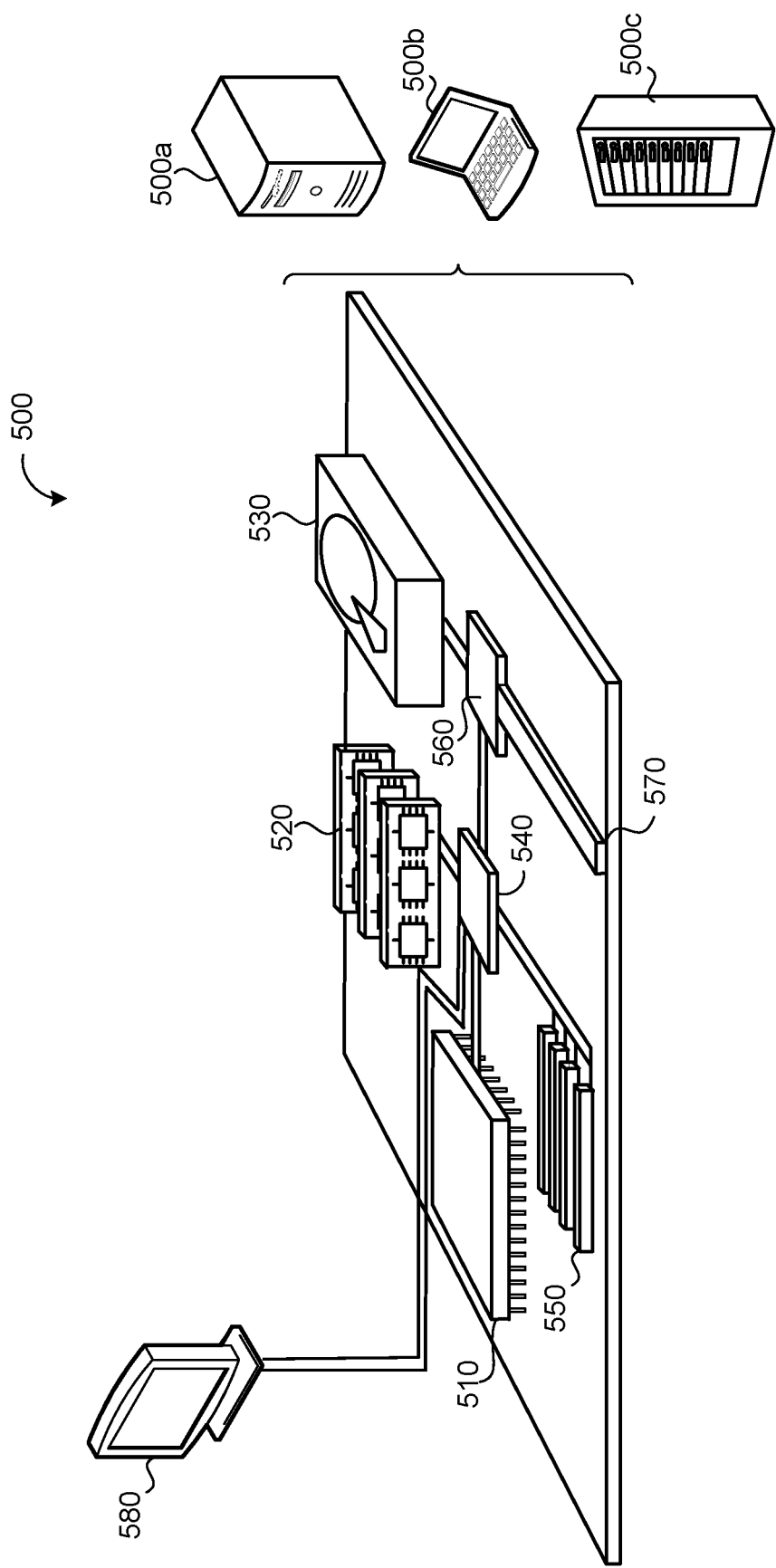
FIG. 5 is a schematic view of an example computing device that may be used to implement the systems and methods described herein.

FIG. 5 is schematic view of an example computing device 500 that may be used to implement the systems and methods described in this document, for example, the encoder 200 and/or the allocator 300. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a data processing hardware 510, memory hardware 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, transform coefficients corresponding to a scaled video input signal, the scaled video input signal comprising a plurality of spatial layers, the plurality of spatial layers comprising a base layer;
determining, by the data processing hardware, a spatial rate factor based on a sample of frames from the scaled video input signal, the spatial rate factor defining a factor for bit rate allocation at each spatial layer of an encoded bit stream formed from the scaled video input signal, the spatial rate factor represented by a difference between a rate of bits per transform coefficient of the base layer and an average rate of bits per transform coefficient for the plurality of spatial layers; and
reducing, by the data processing hardware, a distortion for the plurality of spatial layers of the encoded bit stream by allocating a bit rate to each spatial layer based on the spatial rate factor and the sample of frames.

2. The method of claim 1, further comprising:
receiving, at the data processing hardware, a second sample of frames from the scaled video input signal;
modifying, by the data processing hardware, the spatial rate factor based on the second sample of frames from the scaled video input signal; and
allocating, by the data processing hardware, a modified bit rate to each spatial layer based on the modified spatial rate factor and the second sample of frames.

3. The method of claim 1, further comprising:
receiving, at the data processing hardware, a second sample of frames from the scaled video input signal;
modifying on a frame-by-frame basis, by the data processing hardware, the spatial rate factor based on an exponential moving average, the exponential moving average corresponding to at least the sample of frames and the second sample of frames; and
allocating, by the data processing hardware, a modified bit rate to each spatial layer based on the modified spatial rate factor.

4. The method of claim 1, wherein receiving the scaled video input signal comprises:
receiving a video input signal;
scaling the video input signal into the plurality of spatial layers;
partitioning each spatial layer into sub-blocks;
transforming each sub-block into transform coefficients; and
scalar quantizing the transform coefficients corresponding to each sub-block.

5. The method of claim 4, wherein determining the spatial rate factor based on the sample of frames from the scaled video input signal comprises determining variance estimations of each scalar quantized transform coefficient based on an average across all transform blocks of frames of the video input signal.

6. The method of claim 4, wherein the transform coefficients of each sub-block are identically distributed across all sub-blocks.

7. The method of claim 1, wherein the spatial rate factor comprises a single parameter configured to allocate the bit rate to each layer of the encoded bit stream.

8. The method of claim 1, further comprising determining, by the data processing hardware, that the spatial rate factor satisfies a spatial rate factor threshold.

9. The method of claim 8, wherein a value corresponding to the spatial rate factor threshold satisfies the spatial rate factor threshold when the value is less than about 1.0 and greater than about 0.5.

10. The method of claim 1, wherein the spatial rate factor comprises a weighted sum, the weighted sum corresponding to a ratio of a product of variances, the ratio comprising a numerator based on estimated variances of scalar quantized transform coefficients from a first spatial layer and a denominator based on estimated variances of scalar quantized transform coefficients from a second spatial layer.

11. A system comprising:
data processing hardware; and
memory hardware in communication with the data processing hardware, the memory hardware storing instructions that when executed on the data processing hardware cause the data processing hardware to perform operations comprising:
receiving transform coefficients corresponding to a scaled video input signal, the scaled video input signal comprising a plurality of spatial layers, the plurality of spatial layers comprising a base layer;
determining a spatial rate factor based on a sample of frames from the scaled video input signal, the spatial rate factor defining a factor for bit rate allocation at each spatial layer of an encoded bit stream formed from the scaled video input signal, the spatial rate factor represented by a difference between a rate of bits per transform coefficient of the base layer and an average rate of bits per transform coefficient of the plurality of spatial layers; and
reducing a distortion for the plurality of spatial layers of the encoded bit stream by allocating a bit rate to each spatial layer based on the spatial rate factor and the sample of frames.

12. The system of claim 11, wherein the operations further comprise:
receiving a second sample of frames from the scaled video input signal;
modifying the spatial rate factor based on the second sample of frames from the scaled video input signal; and
allocating a modified bit rate to each spatial layer based on the modified spatial rate factor and the second sample of frames.

13. The system of claim 11, wherein the operations further comprise:
receiving a second sample of frames from the scaled video input signal;
modifying the spatial rate factor based on an exponential moving average, the exponential moving average corresponding to at least the sample of frames and the second sample of frames; and
allocating a modified bit rate to each spatial layer based on the modified spatial rate factor.

14. The system of claim 11, wherein receiving the scaled video input signal further comprises:
receiving a video input signal;
scaling the video input signal into the plurality of spatial layers;
partitioning each spatial layer into sub-blocks;
transforming each sub-block into transform coefficients; and
scalar quantizing the transform coefficients corresponding to each sub-block.

15. The system of claim 14, wherein determining the spatial rate factor based on the sample of frames from the scaled video input signal comprises determining variance estimations of each scalar quantized transform coefficient based on an average across all transform blocks of frames of the video input signal.

16. The system of claim 14, wherein transform coefficients of each sub-block are identically distributed across all sub-blocks.

17. The system of claim 11, wherein the spatial rate factor comprises a single parameter configured to allocate the bit rate to each layer of the encoded bit stream.

18. The system of claim 11, wherein the operations further comprise determining that the spatial rate factor satisfies a spatial rate factor threshold.

19. The system of claim 18, wherein a value corresponding to the spatial rate factor threshold satisfies the spatial rate factor threshold when the value is less than about 1.0 and greater than about 0.5.

20. The system of claim 11, wherein the spatial rate factor comprises a weighted sum, the weighted sum corresponding to a ratio of a product of variances, the ratio comprising a numerator based on estimated variances of scalar quantized transform coefficients from a first spatial layer and a denominator based on estimated variances of scalar quantized transform coefficients from a second spatial layer.

* * * * *